Sept. 9, 1958　　　　　　　　M. FOGIEL　　　　　　　　2,851,120
MOTOR VEHICLE SAFETY SYSTEM
Filed July 5, 1955
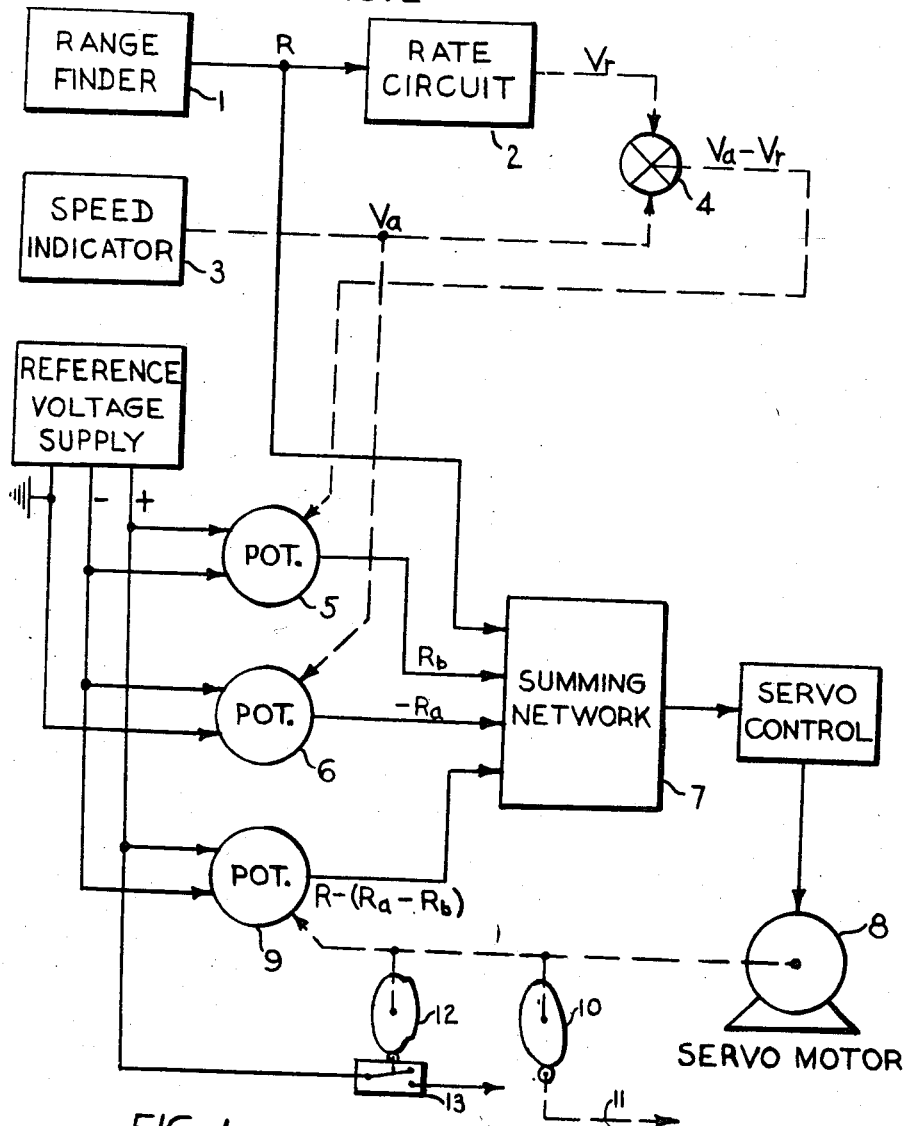
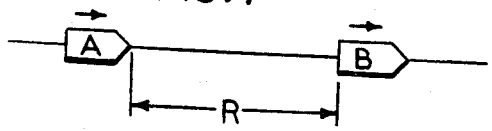
INVENTOR.
Max Fogiel

2,851,120
MOTOR VEHICLE SAFETY SYSTEM

Max Fogiel, New York, N. Y.

Application July 5, 1955, Serial No. 519,765

3 Claims. (Cl. 180—82.1)

This invention relates to a system which will aid in the prevention of motor vehicle accidents by automatically detecting danger and reacting to it by mechanically braking the moving vehicle.

The problem of automobile accidents affecting lives and property is not only critically important at the present time, but it is also becoming more acute as time goes on and the number of vehicles operated by the public increases resulting in a still greater number of highway tragedies. Experience has indicated that a large number of such accidents result because the vehicle operator fails to judge correctly and recognize the moment of danger. Many fail to arrive at the proper decisions after they realize they are in danger. Still others suffer from poor reflex action and cannot react quickly enough to the danger signals after they become aware of them. From this viewpoint it is desirable to equip the vehicle with a system which will anticipate and sense any obstruction in the path of the vehicle, whether it be another moving vehicle, stationary object, or pedestrian. The system is then to automatically act in a manner which will prevent collision between the vehicle and such obstruction. The principles disclosed in this specification are not only applicable to collisions involving automobiles, but they are equally applicable to all motorized vehicles including locomotives, sea, and air-craft.

Figure 1 shows schematically two vehicles traveling in the same direction and straight line separated by a given distance R.

Figure 2 is a functional block diagram of the system used to compute the safe distance between vehicles and to apply the brakes of the vehicle when the existing distance separating the vehicles is smaller than the computed safe one.

A large number of vehicle collisions occur due to the condition that the distance permitted between two vehicles traveling in the same direction and along the same line is not sufficiently large. When the leading vehicle B in Figure 1 stops for any reason whatsoever, the following vehicle A is often unable to stop quickly enough to avoid colliding with the rear of vehicle B. In view of the increasing trend in the number of automobiles on highways and traffic congestions, there is a tendency on the part of the driver to diminish the distance between his own vehicle and the one directly in front of him. The system described in this specification has, among other things, the purpose of regulating the distance between two such consecutive vehicles to insure that a safe margin is maintained.

Referring to Figure 1 assume that vehicle A which is preceded by vehicle B is traveling along with velocity $V_a$. Vehicle B is moving with velocity $V_b$. If vehicle B should suddenly be required to stop, vehicle A will need a distance $R_a$ in which to stop without coming into contact with vehicle B. The magnitude of $R_a$ is a function of the velocity $V_a$ and varies approximately as the square of this velocity. Thus, the kinetic energy of the moving vehicle A is essentially $WV_a^2/2g$ where W is the weight of the vehicle and g is the acceleration due to gravity. This kinetic energy must be dissipated into heat by friction before the vehicle can be stopped. Since the energy dissipated by friction is essentially $\mu W R_a$, where $\mu$ is the coefficient of friction, $$\frac{WV_a^2}{2g} = WR_a\mu$$

$$R_a = \frac{V_a^2}{2g\mu} = KV_a^2$$

The distance $R_b$ in which vehicle B can stop from the instant that braking is begun is obtained in a similar manner. Consequently the safe distance $R_0$ required between vehicles $(R_a - R_b)$. The manner in which the system of Figure 2 causes distance $R_0$ to be maintained may be described as follows. The distance R between vehicles is continuously observed as a function of time by a range finding device 1 such as a radar unit located in vehicle A. The relation of R versus time thus obtained is passed through a rate circuit 2 where it is differentiated to obtain the quantity $$V_r = \frac{dR}{dt}$$

The rate circuit is standard equipment associated with a radar unit in the instrumentation field. The usual radar system is equipped to provide an indication of the relative speed of the object it is tracking. Thus, the rate circuit determines the rate of change of the distance between the radar unit and the object being tracked. In mathematical terms, the rate circuit differentiates the electrical voltage which is proportional to the distance between radar and object. The actual manner in which the rate circuit performs the differentiating process may be obtained from any standard textbook on radar systems. The output of the rate circuit is in the form of a shaft position. The rate circuit rotates a shaft in proportion to the magnitude of the relative speed between radar and object. Thus the shaft is rotated through an arc proportional to the vehicle speed rather than at proportional speeds of revolution. This is similar to the usual speedometer in an automobile. The speedometer contains a shaft with a pointer attached to it. The shaft and consequently the pointer, is rotated through an angle depending on the speed of the vehicle. The output shaft of the rate circuit is rotated in this identical way to give an indication of the relative speed between radar and object. Consequently, the radar system is composed of the range finder which gives the distance between radar and vehicle preceding it, and the rate circuit which provides the rate of change of this distance, or the relative speed. The velocity $V_a$ of vehicle A is determined in the conventional manner by retaining a speed indicating device 3 in contact with the wheels of the vehicle. The speed indicator is similar to the usual speedometer present in automobiles. As already explained, the speedometer or speed indicator 3 rotates a shaft through an arc proportional to the vehicle speed. For instance at 50 miles/hour of vehicle speed, the arc of shaft rotation will be twice that which corresponds to 25 miles/hour. The velocity of the preceding vehicle B is obtained by the computing system in vehicle A from the relation $$V_b = V_a - V_r$$

$V_b$ is obtained mechanically from the output of differential 4 which subtracts $V_r$ from $V_a$. The output shaft of differential 4 is geared to a functional potentiometer 5 which has a voltage output proportional to $R_b$. Thus, corresponding to any value of $V_b$ potentiometer 5 will indicate the proper magnitude of $R_b$. In a similar manner the shaft of potentiometer 6 is rotated proportional to the quantity $V_a$ and its voltage output is proportional to $R_a$. $R_b$ is subtracted from $R_a$ and the resulting quantity is compared with R in summing network 7. The mechanical differential 4 has an output shaft which rotates in proportion to the algebraic sum of its two input shaft rotations. As applied in the system, the output shaft of the rate circuit is mechanically coupled to an input shaft of the differential. This input shaft, therefore, rotates through an arc which is in direct proportion to the output shaft rotation of the rate circuit. The actual mechanical coupling between rate circuit and differential may, of course, be accomplished in numerous different ways including gear trains. The output shaft of the speed indicator is mechanically coupled to the other input shaft of the differential in a similar way. For the purpose of illustration, assume that the radar system through the rate circuit determines that the relative speed $V_r = 20$ miles/hour. If the output shaft of the rate circuit is calibrated to rotate 10 degrees for every 1 mile/hour of relative speed, the shaft rotation will be 200 degrees. Assume that the speed indicator measures 30 miles/hour for the speed of vehicle A. If the output shaft of speed indicator 3 is calibrated to rotate 1 degree for 1 mile/hour, the shaft rotation will be 30 degrees. If output shaft of the rate circuit is connected to its input shaft of the differential through a 1:1 gear train, the input shaft of the differential will also rotate 200 degrees. To take into account the difference in calibration between the output shafts of the rate circuit and speed indicator, the gear train connecting the speed indicator to the other input of the differential must be 10:1. In this manner the shaft of the differential will rotate 300 degrees even though the speed indicator shaft rotates only 30 degrees. The 10:1 gear ratio is derived from the premise that the rate circuit shaft rotates 10 degrees for every mile/hour, while the speed indicator rotates only 1 degree for every mile/hour. The two input shafts to the differential are thus made commensurate and their rotations may be algebraically added. The output shaft of the differential provides this algebraic sum by rotating through an angle of $300+200=500$ degrees. Since the differential is calibrated at 10 degrees of rotation for every mile/hour, the 500 degrees of rotation will represent 50 miles/hour which is the speed of vehicle B.

If the potentiometer 5 is of the two turn type, the sliding contact may rotate through an angle of approximately 720 degrees. If the potentiometer is calibrated to rotate 10 degrees for every mile/hour of speed, the gear train connecting the output shaft of the differential to the potentiometer shaft is 1:1. In this way the potentiometer shaft will rotate through an angle of 500 degrees corresponding to the speed of 50 miles/hour of vehicle B. Potentiometer 6 is similarly positioned by the shaft of speed indicator 3.

Potentiometers 5 and 6 have electrical windings which are non-linear. The windings are such that the output voltage varies as the square of the rotation of the input shaft. Since the output voltage of potentiometer 5 is to be proportional to $R_b$, and $R_b$ is proportional $(V_b)^2$, the electrical winding of potentiometer 5 is formed to provide this square function. Potentiometer 6 is identical to potentiometer 5 in this respect. If the quantity $R-(R_a-R_b)$ is less than zero brakes will be automatically applied to vehicle A by servo motor 8. The shaft of servo motor 8 is positioned proportional to the quantity $R-(R_a-R_b)$ since it is directly geared to the feedback potentiometer 9. The servo motor shaft also causes the rotation of cam 10 which actuates follower 11. Cam 10 is of the nature where the follower is not displaced whenever $R-(R_a-R_b)$ is greater than zero. If, however, $R-(R_a-R_b)$ is less than zero, the instantaneous distance between vehicles is less than the permissible safe one, and the cam causes its follower to be displaced in a manner which will apply braking action to vehicle A. As a result of the displacement of follower 11 which is directly connected to the pistons of the brake cylinders, the braking action is proportional to the quantity represented by the position of the motor shaft. However, when $R-(R_a-R_b)$ is negative and exceeds a given amount $e$, full brakes are automatically applied to the vehicle. Any displacement of the follower in this manner also causes the fuel supply to be cut off from the engine even though the operator of the vehicle maintains the fuel lines open. Automatic closing of the fuel line can also be accomplished by a cam 12 and switch 13. Whenever the value of $R-(R_a-R_b)$ attains the magnitude which requires braking action, cam 12 depresses switch 13 which then transmits an electrical signal to a remotely located solenoid valve in the fuel line. In this manner no mechanical connection is required between the valve in the fuel line and the shaft of servo motor 8.

The mechanical differential is identical to the differential used to drive the rear wheels of automobiles. It has two input shafts and one output shaft. The output shaft rotates to give the algebraic sum of the rotations of the two input shafts. The differential is thus a summing device which performs algebraic addition of two varying inputs. The differential 4 indicated in the disclosure differs from the differential in the rear axle of automobiles only in respect to size and weight by being smaller and lighter.

The potentiometer is a component which has an electrical resistance winding and a slider which can be mechanically moved to contact the resistance winding at any point. The potentiometer has thus three terminals; two terminals for the resistance winding and one terminal for the sliding contact. When the resistance winding is linear, the resistance varies proportionately to the movement of the slider and the potentiometer is designated as a linear potentiometer. When the resistance winding is made nonlinear, the potentiometer is referred to as of the functional type.

The summing network is a circuit used to add a number of quantities represented by voltages. The circuit consists of a number of resistors which have one end all tied together. This common point at which the resistors are all in contact is the output of the network. The other ends of the resistors serve as the input terminals to the network. All of the currents produced in the resistors by the voltages applied to them are thus added together at the common point where the resistors join.

All of the components indicated are of standard manufacture and may be readily obtained from most manufacturers in the instrumentation field. Catalogs of these elements are readily available from such manufacturers. These components are also fully described in any of the standard textbooks dealing with instruments or analog computers.

Cam 10 and follower 11 may be eliminated from the system in the following way. Replace the feedback potentiometer 9 by means of a functional potentiometer whose output voltage is proportional to the quantity $R-(R_a-R_b)$ and whose shaft displacement corresponds to this output voltage in the same fashion described for the displacement of follower 11. The position of the shaft of servo motor 8 thus represents the desired amount of braking action which is a function of $[R-(R_a-R_b)]$. Consequently the shaft of servo motor 8 can be directly and mechanically coupled to the brake cylinders without employing the intermediate components cam 10 and follower 11.

When the velocity of vehicle B is oppositely directed to that of A, i. e., the two vehicles approach each other, $V_b$ is computed as a negative quantity and the corresponding value of $R_b$ is also negative. For this reason potentiometer 5 has both positive and negative reference voltages applied to it. $V_a$ is always positive in sense. With $R_b$ as a negative quantity the required safe distance $(R_a-R_b)$ between vehicles is greater than that required for the case where $R_b$ is positive. As an illustration assume that vehicles A and B approach each other but each is moving in the lane adjacent to the other. Suddenly vehicle B leaves its own lane and crosses over in a manner so that the vehicles approach each other in the same lane. In this case $R_b$ is negative and the quantity $R_a-R_b$ is positive. Assuming the instantaneous distance R between vehicles is exceeded by the quantity $(R_a-R_b)$ by the amount $e$, full braking action will automatically be applied to vehicle A. Vehicle B will also be stopped in this manner assuming it possesses similar safety equipment, and collision may thus be averted. In the case where vehicle B suddenly crosses the path of vehicle A the value of $V_b$ as computed by the system of vehicle A is zero, but braking action to vehicle A will or will not be applied depending on the manner in which the required safe distance $(R_a-R_b)$ compares with the instantaneous distance R. Vehicle B will not be braked under these conditions which is what is desired. It is required that vehicle B have similar safety equipment available in order to avoid collision in the opposite case where vehicle A crosses the path of B. By installing it in all vehicles, therefore, the computing and control system tends to avoid collisions at the rear, front, or side of the vehicle by anticipating danger and causing immediate and automatic reaction. The error in observation and judgment of the human operator is thereby eliminated as well as the important interval of time between the instant that the operator observes danger and the instant that he is actually able to exert physical force and apply the brakes to his vehicle. The computing and control system as shown in Figure 2 is applicable to all motor driven vehicles such as automobiles, locomotives, sea, and air-craft.

I claim:

1. A motor vehicle safety system comprising in combination a motor vehicle, a range detecting device to give an electrical voltage representing the distance between said motor vehicle and the stationary or moving object preceding said motor vehicle, a rate circuit, an electrical path from the output of said range detecting device to said rate circuit, said rate circuit to differentiate said output of said range detecting device as a function of time to give the relative speed between said motor vehicle and said object preceding said motor vehicle, a speed indicating device adapted to measure the speed of said motor vehicle with respect to the ground, said speed indicator to position a mechanical shaft proportional to said speed of said motor vehicle, a mechanical summing means having two inputs and one output, the two inputs of said summing means being separately coupled to the output shafts of the rate circuit and speed indicator, said summing means to algebraically add the angular shaft positions from the two inputs of said rate circuit and said speed indicator, a first potentiometer having its input shaft mechanically coupled to said output of said summing means, the electrical winding of said first potentiometer being adapted to provide output voltage proportional to the square of the position of its input shaft, said output voltage of said first potentiometer to represent the braking distance of said preceding object, a second potentiometer having its input shaft mechanically coupled to the output shaft of said speed indicator, the electrical winding of said second potentiometer being adapted to provide output voltage proportional to the square of the position of its input shaft, said output voltage of said second potentiometer to represent the braking distance of said motor vehicle, a reference voltage supply to provide positive, negative, and ground reference voltages to said potentiometers, a summing network, an electrical path from the output of said range detecting device to a first input terminal of said summing network, an electrical path from the output terminal of said first potentiometer to a second input terminal of said summing network, an electrical path from the output terminal of said second potentiometer to a third input terminal of said summing network, the algebraic sum of the voltages of said first, second, and third input terminals of said summing network to represent the comparison between the safe distance to be maintained and the actual distance existing between said motor vehicle and said preceding object, a servo motor to maintain said actual distance equal to said safe distance by supplying braking action to said motor vehicle when necessary, a servo control to control said servo motor in accordance with the voltage output of said summing network, a third potentiometer having its input shaft mechanically coupled to the shaft of said servo motor, the electrical winding of said third potentiometer being adapted to provide output voltage proportional to the position of its input shaft, an electrical path from the output terminal of said third potentiometer to a fourth input terminal of said summing network, said output voltage of said third potentiometer being equal in magnitude but opposite in polarity to the algebraic sum of the voltages of the first, second, and third input terminals of said summing network when said servo motor is at null position, an electrical switch operating cam mechanically coupled to the shaft of said servo motor, the angular position of said cam representing the difference between said actual distance and said safe distance, an electrical switch to be operated by said switch cam, means to supply control voltage to said switch, a solenoid valve located in the fuel line of said motor vehicle, an electrical path from said switch to said solenoid valve, said cam operated switch to close said solenoid valve when said servo motor applies braking action to said motor vehicle, a cam and follower combination to control the braking action of said motor vehicle, said cam being mechanically coupled to the shaft of said servo motor and representing in angular position the difference between said actual distance and said safe distance.

2. The motor vehicle safety system of claim 1 wherein the electrical winding of said third potentiometer is adapted to vary in accordance with the braking action of said vehicle, and the shaft of said servo motor is directly connected to the brake cylinders of said vehicle.

3. A motor vehicle safety system comprising in combination a motor vehicle, a range detecting device to give an electrical voltage representing the distance between said motor vehicle and the stationary or moving object preceding said motor vehicle, a rate circuit, an electrical path from the output of said range detecting device to said rate circuit, said rate circuit to differentiate said output of said range detecting device as a function of time to give the relative speed between said motor vehicle and said object preceding said motor vehicle, a speed indicating device adapted to measure the speed of said motor vehicle with respect to the ground, said speed indicator to position a mechanical shaft proportional to said speed of said motor vehicle, a mechanical summing means having two inputs and one output, the two inputs of said summing means being separately coupled to the output shafts of the rate circuit and speed indicator, said summing means to algebraically add the angular shaft positions from the two inputs of said rate circuit and said speed indicator, a first potentiometer having its input shaft mechanically coupled to said output of said summing means, the electrical winding of said first potentiometer being adapted to provide output voltage proportional to the square of the position of its input shaft, said output voltage of said first potentiometer to represent the braking distance of said preceding object, a second potentiometer having its input shaft mechanically coupled to the output shaft of said speed indicator, the electrical winding of said second potentiometer being adapted to provide output voltage proportional to the square of the position of its input shaft, said output voltage of said second potentiometer to represent the braking distance of said motor vehicle, a reference voltage supply to provide positive, negative, and ground reference voltages to said potentiometers, a summing network, an electrical path from the output of said range detecting device to a first input terminal of said summing network, an electrical path from the output terminal of said first potentiometer to a second input terminal of said summing network, an electrical path from the output terminal of said second potentiometer to a third input terminal of said summing network, the algebraic sum of the voltages of said first, second, and third input terminals of said summing network to represent the comparison between the safe distance to be maintained and the actual distance existing between said motor vehicle and said preceding object, a servomotor to maintain said actual distance equal to said safe distance by supplying braking action to said motor vehicle when necessary, a servo control to control said servomotor in accordance with the voltage output of said summing network, a third potentiometer having its input shaft mechanically coupled to the shaft of said servomotor, the electrical winding of said third potentiometer being adapted to provide output voltage proportional to the position of its input shaft, an electrical path from the output terminal of said third potentiometer to a fourth input terminal of said summing network, said output voltage of said third potentiometer being equal in magnitude but opposite in polarity to the algebraic sum of the voltages of the first, second, and third input terminals of said summing network when said servomotor is at null position, an electrical switch operating cam mechanically coupled to the shaft of said servomotor, the angular position of said cam representing the difference between said actual distance and said safe distance, an electrical switch to be operated by said switch cam, means to supply control voltage to said switch, means to remove the driving power from said vehicle when actuated by a voltage signal from said switch, said cam operated switch to provide a signal for causing the removal of the driving power from said motor vehicle when said servomotor applies braking action to reduce the speed of said motor vehicle, a cam and follower combination to control the braking action for reducing the speed of said motor vehicle, said cam being mechanically coupled to the shaft of said servomotor and representing in angular position the difference between said actual distance and said safe distance.

References Cited in the file of this patent

UNITED STATES PATENTS

| | | |
|---|---|---|
| 2,444,171 | Sanders | June 29, 1948 |
| 2,513,279 | Bradley | July 4, 1950 |
| 2,690,555 | Bradley | Sept. 28, 1954 |
| 2,699,834 | O'Brien | Jan. 18, 1955 |
| 2,702,342 | Korman | Feb. 15, 1955 |